United States Patent
Lagosanto et al.

(10) Patent No.: US 8,799,350 B2
(45) Date of Patent: Aug. 5, 2014

(54) METHOD AND DEVICE FOR ESTABLISHING NETWORK COMMUNICATION COMPATIBILITY OF TERMINALS

(75) Inventors: Laurent Lagosanto, Marseille (FR);
Jean-Jacques Vandewalle, Hellemmes (FR)

(73) Assignee: Gemalto SA, Meudon (FR)

( * ) Notice: Subject to any disclaimer, the term of this patent is extended or adjusted under 35 U.S.C. 154(b) by 3179 days.

(21) Appl. No.: 10/485,469

(22) PCT Filed: Jul. 11, 2002

(86) PCT No.: PCT/FR02/02455
§ 371 (c)(1),
(2), (4) Date: Jul. 13, 2004

(87) PCT Pub. No.: WO03/013100
PCT Pub. Date: Feb. 13, 2003

(65) Prior Publication Data
US 2005/0021600 A1  Jan. 27, 2005

(30) Foreign Application Priority Data
Aug. 2, 2001  (FR) ...................................... 01/10390

(51) Int. Cl.
*G06F 15/16* (2006.01)
*G06F 15/173* (2006.01)
*G06F 15/177* (2006.01)

(52) U.S. Cl.
USPC ............................. 709/203; 709/217; 709/224

(58) Field of Classification Search
USPC ......................................... 709/203, 217–224
See application file for complete search history.

(56) References Cited

U.S. PATENT DOCUMENTS

| 5,898,838 | A  | * | 4/1999 | Wagner | 709/224 |
| 6,839,756 | B1 | * | 1/2005 | Boudou et al. | 709/225 |
| 6,944,650 | B1 | * | 9/2005 | Urien | 709/217 |

(Continued)

FOREIGN PATENT DOCUMENTS

| DE | 19802684 A | 12/1998 | |
| WO | WO 9857474 A | 12/1998 | |
| WO | WO 9914678 A | 3/1999 | |
| WO | WO 0159563 A1 * | 8/2001 | 705/41 |

OTHER PUBLICATIONS

"A method and means for managing communications between local and remote objects in an object oriented client server system . . . ", pp. 2 through 30, Oct. 14, 1998, U.S. Appl. No. 09/172,942.*

(Continued)

*Primary Examiner* — Haresh N Patel
(74) *Attorney, Agent, or Firm* — Buchanan Ingersoll & Rooney PC

(57) ABSTRACT

In order to set up a communication channel on a link connecting a client application on a client machine and a service application present on a device dependent on a terminal, the client machine includes a representative of the service application. A formatting module is located at the client machine, downstream of the representative, for formatting the client application messages in a form readable by the service application. A gateway is located at the terminal, for receiving the messages readable by the card and transmitting them to the service application. Typically, the communicating device is a smart card, and the service application is a card application. The link is typically a network, for example of the Internet type.

12 Claims, 6 Drawing Sheets

(56) References Cited

U.S. PATENT DOCUMENTS

| | | | |
|---|---|---|---|
| 7,003,663 B2* | 2/2006 | Lagosanto et al. | 713/159 |
| 7,185,064 B1* | 2/2007 | Mariana | 709/217 |
| 7,191,234 B2* | 3/2007 | Farrugia et al. | 709/227 |
| 2001/0039587 A1* | 11/2001 | Uhler et al. | 709/229 |
| 2002/0082847 A1* | 6/2002 | Vandewalle et al. | 705/1 |
| 2002/0083142 A1* | 6/2002 | Lagosanto et al. | 709/207 |
| 2002/0083322 A1* | 6/2002 | Lagosanto et al. | 713/172 |
| 2002/0116478 A1* | 8/2002 | Paradinas et al. | 709/220 |
| 2002/0174071 A1* | 11/2002 | Boudou et al. | 705/41 |
| 2004/0154027 A1* | 8/2004 | Vandewalle et al. | 719/330 |
| 2005/0021600 A1* | 1/2005 | Lagosanto et al. | 709/203 |
| 2007/0118474 A1* | 5/2007 | Tushie et al. | 705/41 |

OTHER PUBLICATIONS

"Smart Card Operating Systems Overview and Trends", Pierre. Paradinas@gemplus.com, Gemplus Labs, pp. 1-21.*

PCT WO 00/56030, Urien Pascal, pp. 1-89, Publication date Sep. 21, 2000, System for accessing an object using a "web-browser" co-operating with a smart card.*

* cited by examiner

METHOD AND DEVICE FOR ESTABLISHING NETWORK COMMUNICATION COMPATIBILITY OF TERMINALS

This disclosure is based upon French Application No. 01/10390, filed Aug. 2, 2001, and International Application No. PCT/FR02/02455, filed on Jul. 11, 2002, the contents of which are incorporated herein by reference.

BACKGROUND OF THE INVENTION

The invention concerns network communication, for example between a server terminal and an application terminal. It relates more particularly to a method and device making it possible to establish a communication channel on a network while the terminals do not have the same software interface for exchanging messages on the network. Such a situation arises, for example, when the server terminal is embodied by a smart card or the like.

In the following description, consideration will be given to the case of communication with a smart card comprising a service application (Applet) written in a high-level language, in particular an object-oriented language, such as Java, C++, etc. The assembly constituted by the card and the service application forms a card application. This assembly constitutes a server terminal capable of participating in communication with a client terminal, either local or on a network.

FIG. 1 depicts schematically the functional elements which are involved during communication in local mode between a smart card 2 and a client machine 4, the latter possibly being a terminal in a centralised system. A local connection LL provides the bidirectional exchange between the client machine 4 and the card 2 via respective communication interfaces 6 and 8. The local connection LL can be a serial or parallel cable between the client machine 4 and the card 2 (or its reader), or else a radio link if the card 2 operates in contactless mode.

The client machine 4 comprises the client application 10 which must establish a dialogue with a service application 12 integrated in the card 2 and hereinafter designated "card application". In the example, the card application is implemented in a form referred to as an "Applet", which is a recognised term within the context of the "JavaCard" language. At the level of the client and service applications, the dialogue is performed by messages in the high-level language sent by the client application 10 of the machine 4. These messages generally comprise processing instructions to be performed on data which are stored within the card 2. There will then be, for example, for a card electronic purse: m=purse debit (parameter=sum(numerical value), n=purse credit (parameter=sum(numerical value); O=balance (no parameter) (results of the operations). By way of illustration, the commands have a syntactic structure of the "debit(sum)" type (for the case of the aforementioned command m).

These commands cannot pass as such on the local connection LL, given that said connection imposes the use of specific protocol and formatting. There is then installed, on the client machine side of the local connection LL, a succession of software layers between the client application and the communication interface 6.

Starting from the client application 10, a first software layer constitutes what is referred to as the card application representative 14, also known by the term "proxy". The representative is a layer developed and coded by the developer of the card application 12, which is used to present a software interface enabling communication with this application. It is an interface from the functional point of view of the card application, that is to say on the "job" side of the application, dedicated entirely to said application. The representative 14 then serves to establish compatibility of the commands of the client application 10 with those recognised by the card application 12. It is therefore necessary to produce the code of the representative according to the card application.

The framing of an element in the figures with a double line, used in particular for identifying the representative 14, indicates the codes to be developed and transmitted to the client machine 4 in order to be able to use the card application 12.

Thus, using again the example of a command of the client application 10 with the syntactic structure "do Sthg" with parameters, that is "do Sthg(parameters)", the representative will produce—on the assumption that this command is recognised by the card application 12—a so-called formatting command, that is "format(do Sthg(parameters))". It should be noted that the parameters can, if need be, be non-existent, giving the structure "do Sthg()". In the following description, the parameters are not designated explicitly. Thus, using again the example of the aforementioned command m, its representation in the general form will be "do Sthg (parameters)".

This formatting command is transmitted to a downstream so-called card formatting layer CFcard 16, which provides the conversion of the code issuing from this command into a message format adapted to the communication device. Its function is in particular to structure the message to be dispatched to the card application. By way of example, if the command is intended directly for the card 2, the format produced by the formatting layer 16 will be of the APDU (Application Protocol Data Unit) type; if it goes by means of a wireless protocol, it will conform to an SMS (Short Message Service) code; it can also be a format specific to a card, such as the JC21RMI (JavaCard 2.1 RMI) format.

Once the message has been structured, it is ready to be dispatched on the local connection LL. For this purpose, a communication protocol, that is a transport layer TRcard 18, which is responsible for sending the message, is used. This layer 18 provides the transport of the message according to a given protocol, for example: OTA (Over The Air), PCMCIA, Serial Port, etc. The transport layer TRCard 18 thus "packages" the messages which have been formatted in a structure adapted to transportation on the local connection LL. The messages thus packaged are then transmitted to the card 2, via the communication interfaces 6 and 8 and the local connection LL.

On the side of the card 2, there are found again the same layers as in the client machine 4 for successively carrying out the inverse operations (referred to as "dual" operations) in order to reach, from the data transmitted from the transport layer TRCard 18, the high-level command, in this case "do Sthg".

Thus, at the card 2, the first layer on the side of the interface 8 is a dual transport layer TRcard$^{-1}$ 20 which has the function of "unpackaging" each message received on the local connection LL. In the case of the message coming from the command "do Sthg", the dual layer TRcard$^{-1}$ 20 produces a command for "unformatting" the message "Card Msg", that is "unformat(Card Msg)".

This command is received by an unformatting layer CFcard$^{-1}$ 22, which is dual with regard to the layer CFcard 16, and which produces in response the order for transmitting the command "do Sthg(parameters)" to a card command driver 24.

The driver 24 essentially acts as a router, its function being to direct the command thus unformatted to the card application 12 which is intended for it.

The "Applet specific code" arrow F1 in the figure, between the card application 12 and the representative 14, indicates that, for the development of a card application (for example an Applet), the representative of this application must be installed on the client application.

Of course, the same instances of message processing are applied, in reverse order, for the returns of the card application 12 to the client application 10, as shown by the dotted arrows.

It may be noted that, in the figure, everything which exists between the various rectangles are calls to a routine in the rectangle situated downstream.

The "Card Message" entity (Card Msg) is an exchange format which contains the name of the method (for example "do Sthg") and which structures the parameters according to the protocol which is going to be used next. The card message constitutes the complete method call, therefore its name and parameters, which will be structured according to a communication protocol.

When this message is dispatched to the transport layer TRcard 18, a change is made from the APDU protocol to the so-called TPDU protocol, which constitutes the transport protocol. For dispatching the message, it is broken down into a series of bits and packets on the line. The message is then effectively a coding of a function. When it passes over a transport layer, it is in the form of frames.

It may be understood that the representative constitutes a gateway which enables the client application 10 to dialogue as if the card application 12 were present on the client machine; in other words, it "represents" the service application in the sense that the client application interacts with the representative via the same high-level messages. The representative therefore has the same functional interface, at the same access level, as the service application in the card. In that way, when the client application is called to communicate with the service application in the card, this client application will not have to encode the messages in order to pass them to a driver module, but will instead only have to send the desired command.

The layers are always the same, irrespective of the devices. Thus, for communication between a client and a remote terminal, the stratification of the layers remains unvarying.

This community of layers is illustrated in FIG. 2, which represents a structure similar to that of FIG. 1, but applied to the case of communication on a network R, such as the Internet, between a client machine 30 and a server machine 32.

More particularly, communication is established between a client application 10, installed in the client machine 30, and a network server 34, analogous to the card application 12 of FIG. 1, installed in the server machine 32.

The network server 34 is then represented, at the client machine 30, by a network server representative 36, like the card representative 14 of FIG. 1.

In FIG. 2, and those which follow, the hardware communication interfaces are not depicted for reasons of simplicity, given that these means are well known.

The commands issuing from the network server representative 36 are processed successively by a network formatting layer CFnet 38 and a network transport layer TRnet 40, analogous respectively to the layers CFcard 16 and TRcard 18 of FIG. 1. The layer TRnet 40 provides in particular the division of the messages into frames adapted to the standards of transport on the network R.

On the side of the server machine 32, there are found again the dual transport layer TRnet$^{-1}$ 42 which takes delivery of the frames received from the network R and reconstructs them into messages as they were at the output of the layer CFnet 38.

The layer TRnet$^{-1}$ 42 is followed by the dual layer CFnet$^{-1}$ 44, which is a network unformatting code having the function of converting the reconstructed messages into high-level language, for example in the form "dispatch "do Sthg"".

The commands issuing from the layer CFnet$^{-1}$ are transmitted to a network command driver 46, which delivers them to the application intended to process them, in this case the network server 34.

It may be noted that it is still necessary to develop the specific code for the network server representative 36 according to the server 34 it has to represent.

The use of the network server representative 36 and the network command driver 14 at the respective ends of the network R enables the client application 10 of the client machine 30 to isolate itself from the communication protocols, its operation as regards communication remaining at general format level. The representative and the command driver are generic with respect to the communication protocol.

From the message transmission structures according to FIGS. 1 and 2, it is conceivable, by simple concatenation of means, to make a card application communicate with a client application via a network R, and thus to make the card communicate with any remote terminal.

In this case, the card application will be connected to a network server via a local connection, and the client application will be connected to the network server via a network connection.

The implementation then consists of a concatenation of the transmission chains of FIGS. 1 and 2, as shown in FIG. 3. The elements of this figure already mentioned within the context of FIG. 1 or 2 bear the same references and will not be described again for the sake of conciseness.

According to this concatenation, there are found again on the side of the client machine 30 the client application 10 followed by its three layers: the "Network Applet" representative (call to the method) 36, the network formatting code (coding of the call) CFnet 38 and the network transport layer TRnet 40. In this specific case, the server representative 36 of FIG. 2 here becomes the representative of the card application (Applet), designated by the reference 36'.

At the terminal 31 associated with the card 2, downstream of the network R from the packet transmission layer TRnet, all the dual layers, namely successively TRnet$^{-1}$ 42 and CFnet$^{-1}$ 44, are gone back up through in order to transmit a command ("do Sthg") to the command driver 46, in order that it is directed to the network server 34.

Next, the command "do Sthg" is re-dispatched from the network server 34 to the card application representative 14 within the terminal 31. The representative sends in response the command "format("do Sthg")" to the layer CFcard 16 which then sends the card message (Card Msg) to the transport layer TRcard 18 so that this message is transmitted in packet form on the local connection LL to the card 2.

At the card 2, the packets are processed successively by the dual layers TRcard$^{-1}$ 20 and CFcard$^{-1}$ 22 in order to obtain the instruction for transmitting the command ("do Sthg") to the card command driver 24. Finally, the latter transmits the command "do Sthg" to the card application 12.

To summarise, the production of a service application and a client application comprises the following steps:
 writing of a service application;
 writing of a representative for the terminals;

implementation of the client application with for example user interfaces (windows, menus, etc.), communicating in a high-level language with the card application representative.

It may be noted that the main links in the communication chain between the client application on the client machine 30 and the card 2 application on the terminal 31 comprise: a network server 34, a network server representative 36' and a representative 14 of the card application 12 at the terminal 31. Each of these elements 34, 36' and 14 comprises computer code which is onerous to write and maintain. If the application changes so that it can make use of other messages, it then becomes necessary to take action separately on the code of each of these three links, the network representative 36' having to be thus modified for all machines capable of communicating with the client application.

Part of this code can be produced by representative generation techniques, but it still remains that the installation or modification of an application in a network environment is tedious.

This code must furthermore be deployed, that is to say it is necessary to install the card representative 14 and the network server 34 on the respective terminals, connect these two links 14 and 34, and then install the representative on the client application. Next, all these three links must be connected in order to provide proper communication, in particular between the network server 34 and the card representative 14.

The deployment difficulties are then of the nature of management and maintenance. The more complex and long the code of these links is to produce, the greater are the risks of error, especially if said code is written manually.

Furthermore, on account of the large number of software layers between the client application 10 and the service application 12, the communication can suffer from a significant delay in response time. Moreover, the connections between each software layer involve interfacing problems which add to the aforementioned delays.

The effect of this is a significant delay in response time, since processing is performed at each link.

Finally, this approach lends itself badly to providing security from one end of the chain to the other. This is because it is then necessary to provide a step of encryption and decryption of the messages respectively upstream and downstream of each link 36', 34 and 14 so that the messages can be understood by said links.

A proposal was recently made in "Mobile Objects Embedded in an Internet Smart Card, for the Commerce of Multimedia Virtual Objects", P. Urien, Bull R&D, OCM 2000 Conference, Objects, Components and Models, "Past, Present and Future", 18 May 2000, École des Mines de Nantes, for solving these problems of network access to a remote card by putting the card in the format of the network. The idea is then that, instead of having a particular protocol for communicating with the card, which necessitates the installation of a driver between the terminal and the card, the card is directly accessible as if it were a server on the network.

With this approach, the connection is established with a remote client, a standard network representative, the network, and the card directly connected to the network. There are no longer intermediate links between the card and the network.

However, it turns out that it is impossible to produce such a card in the current state of the art.

SUMMARY OF THE INVENTION

In view of the above, the invention proposes, according to a first aspect, a system establishing a communication channel on a connection connecting on the one hand a client application on a client machine and on the other hand a service application present on a device dependent on a terminal, the client machine comprising a representative of the service application, characterised in that it also comprises:
a formatting module situated at the client machine, downstream of said representative, for formatting the messages of the client application in a form understandable by the service application; and
a gateway situated at the terminal, for taking delivery of said messages understandable by the communicating device and transmitting them to the service application.

In one advantageous embodiment, the communicating device is a smart card, the service application being a card application.

Advantageously, the system also comprises means for making the messages secure operating at the level of the formatting module or upstream thereof in order to enable the secure messages issuing from the formatting module to pass in secure form through the gateway and as far as the communicating device.

According to one embodiment, the connection can comprise a network connecting the client machine and the terminal, the gateway being a gateway of the network/communicating device type.

In this case, the formatting module can be connected to the network via a concatenation of modules consisting successively of:
a representative of said gateway, for receiving the formatting commands from the formatting module and in response producing formatting commands from these commands according to a format understandable by said gateway;
a network formatting module for formatting said commands from the gateway representative as messages in the network format; and
a transport module for adapting said messages to the standards of the network;
the gateway being connected to the network via a concatenation of modules consisting successively of:
a module dual with the transport module connected to the network for retrieving said messages issuing from the network;
a module dual with the network formatting module for retrieving the commands as issuing from the representative of said gateway; and
a network command driver for transmitting the messages coming from the preceding module to the gateway.

In another embodiment, provision can be made that:
the formatting module is connected to the network via a transport module intended to directly receive the messages from the formatting module and format them to the standards of the network; and that
the network/communicating device gateway is connected to the network via a module dual with the transport module for directly retrieving therefrom said messages and retransmitting them directly to said gateway.

According to yet another embodiment, the client machine and the terminal can be combined on one and the same physical medium, being connected by an internal connection, the formatting module being provided for directly transmitting on the internal connection the formatted client application messages to the gateway.

According to another, second aspect, the invention provides an assembly forming a terminal specifically adapted to the aforementioned system, characterised in that it comprises a gateway of the network/communicating device type, adapted for receiving and processing equally well messages from a client application in network format delivered by internal connection or by network.

According to a third aspect, the invention provides a method of establishing a communication channel on a connection connecting on the one hand a client application on a client machine and on the other hand a service application, present on a communicating device dependent on a terminal, the client machine comprising a representative of the service application, characterised in that it comprises:

a formatting step carried out at the client machine, downstream of the representative, in order to format the messages from the client application in a form understandable by the service application; and the constitution of a gateway at the terminal, in order to take delivery of said messages understandable by the card and transmit them to the service application.

The optional characteristics of the invention presented within the context of the system (first aspect) can be applied mutatis mutandis to the above method according to the second aspect, and will not be repeated for the sake of conciseness.

According to a fourth aspect, the invention provides for the use of a gateway of the network/communicating device type for the reception of messages issuing from a client application and transmitted directly to the gateway by an internal connection, the messages being formatted as network messages.

BRIEF DESCRIPTION OF THE DRAWINGS

The invention and the advantages which follow therefrom will emerge more clearly from a reading of the preferred embodiments, given solely by way of non-limiting examples, with reference to the accompanying drawings in which.

DETAILED DESCRIPTION

Figure 1:
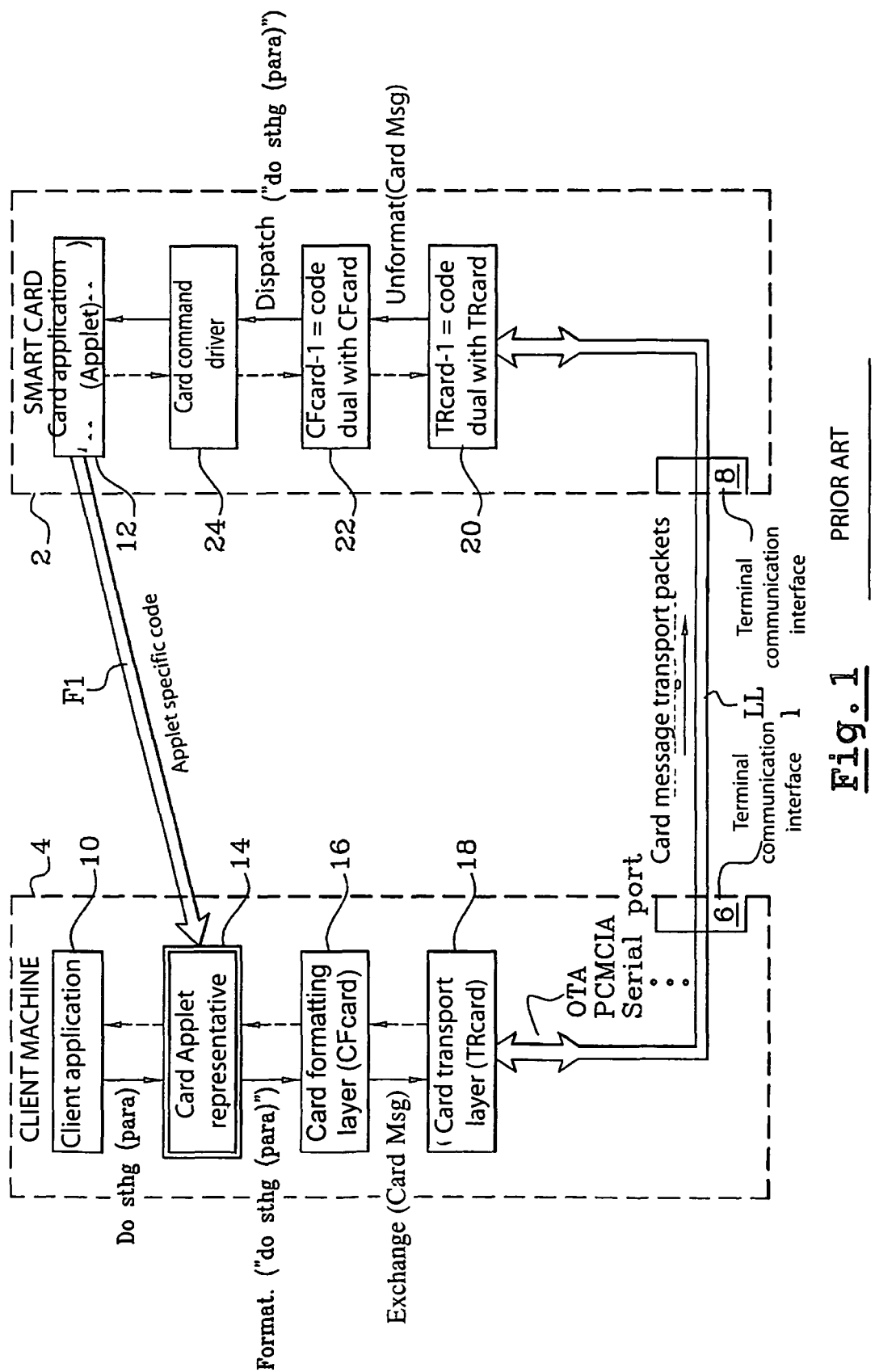
FIG. 1, already described, is a block diagram of the links involved for implementing communication between a client application and a card application via a local connection according to a known technique.
Figure 2:
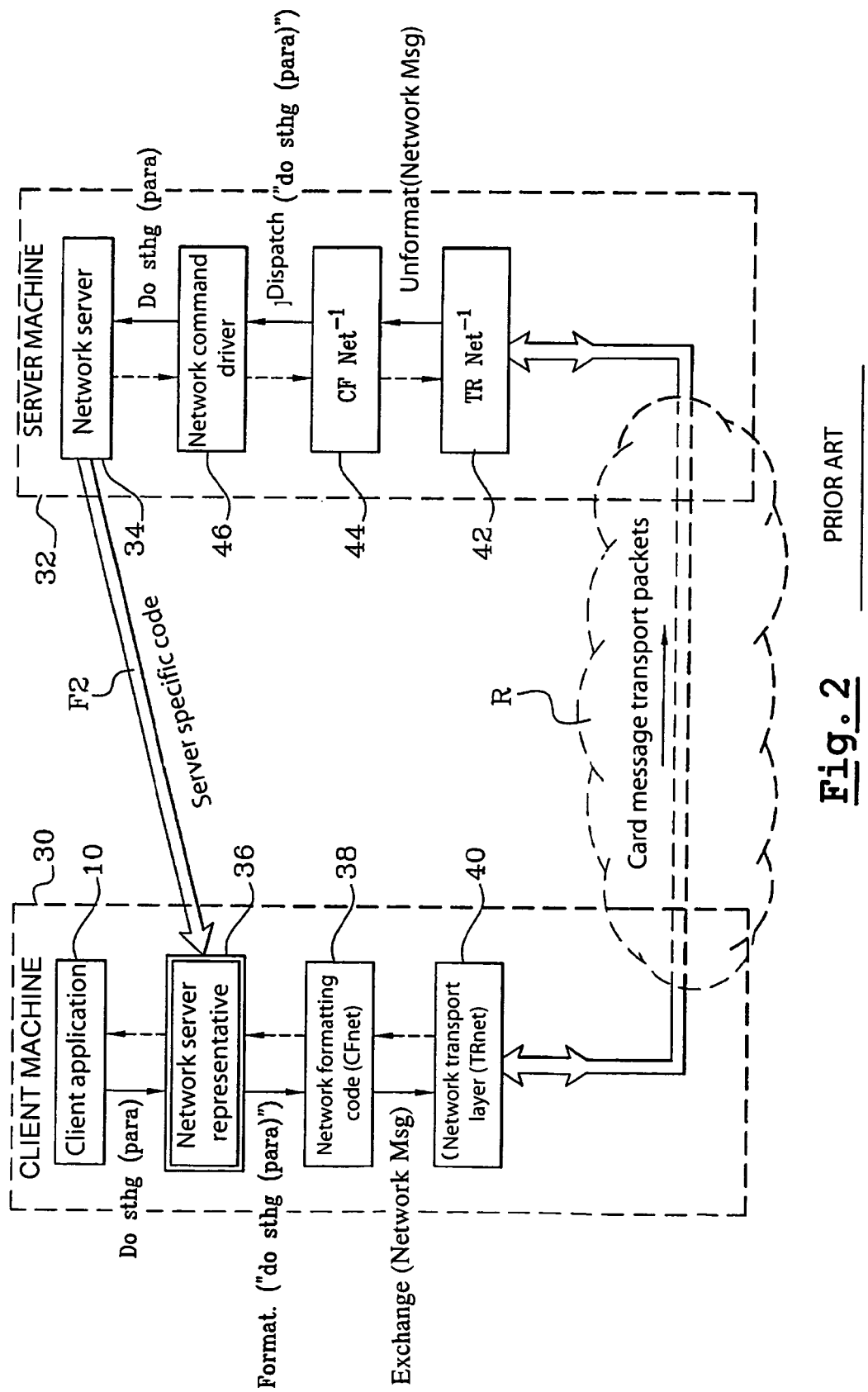
FIG. 2, already described, is a block diagram of the links involved for implementing communication between a client machine and a server machine via a network, such as the Internet, according to a known technique.
Figure 3:
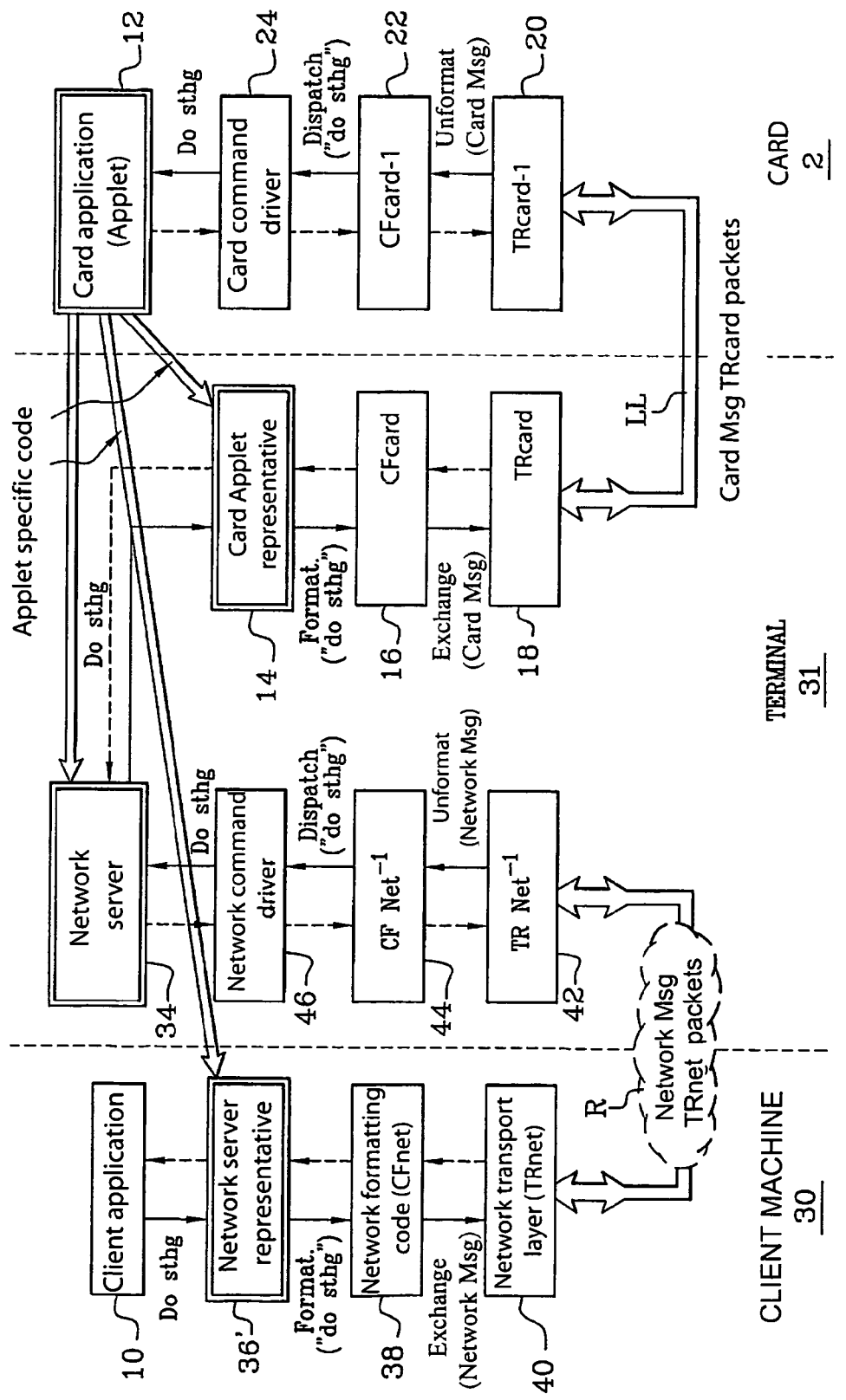
FIG. 3, already described, is a block diagram of the links involved for implementing communication between a client application on a client machine and a card application via a network, by simple combination of the means of FIGS. 1 and 2.
Figure 4:
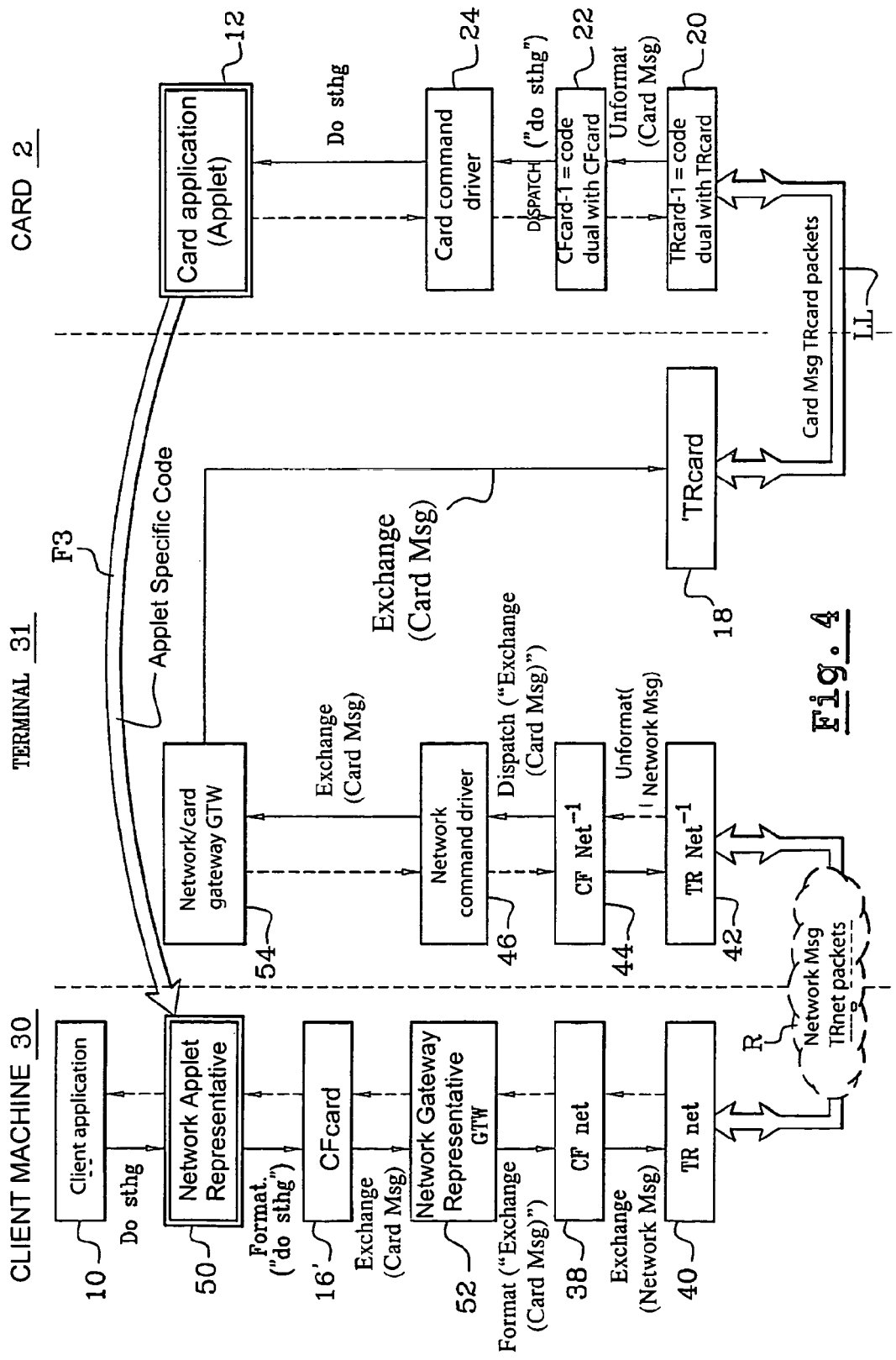
FIG. 4 is a block diagram of the links involved for implementing communication between a client application on a client machine and a card application via a network according to a first embodiment of the invention.
Figure 5:
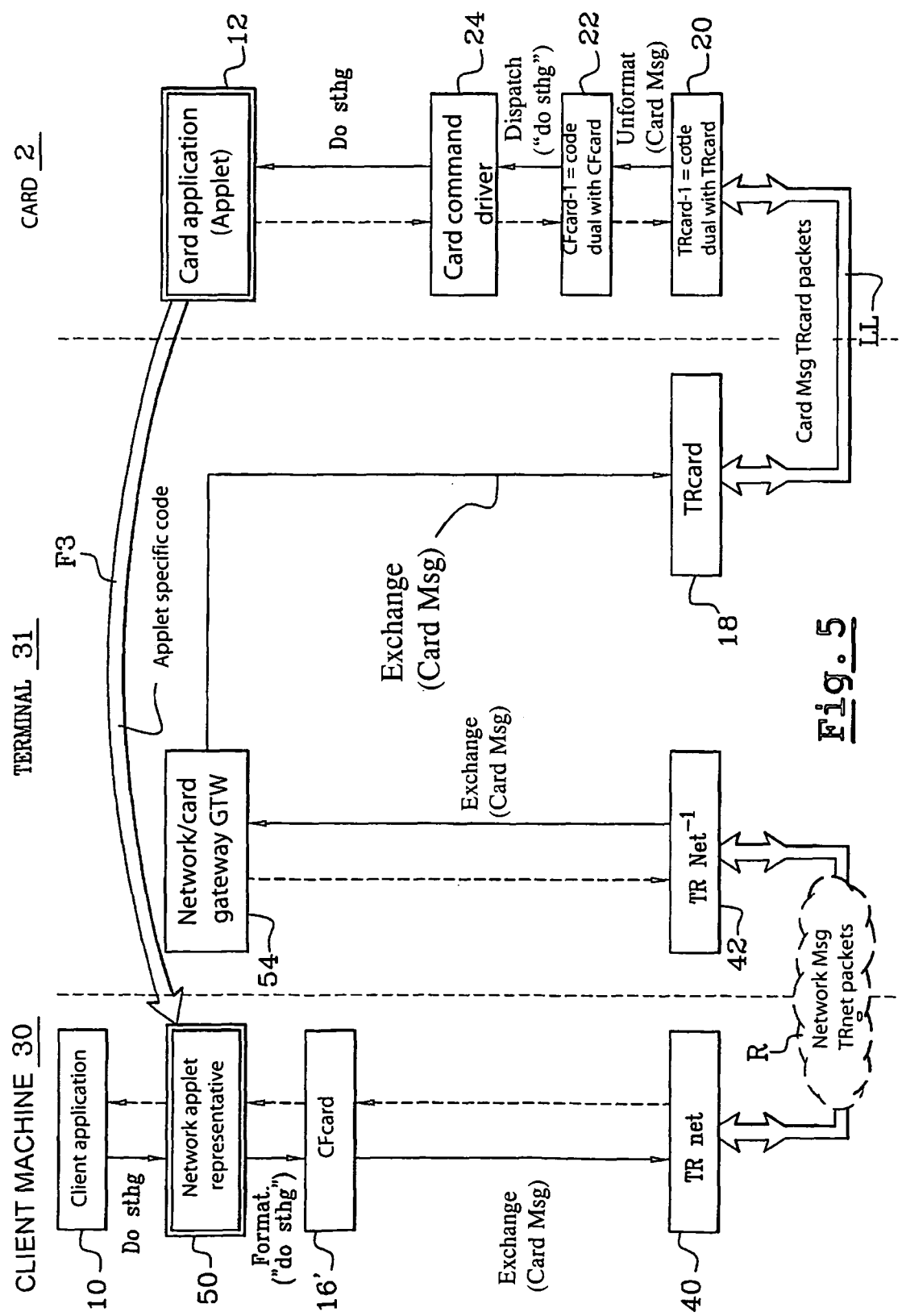
FIG. 5 is a diagram similar to that of FIG. 4, depicting a variant which constitutes a second embodiment of the invention.
Figure 6:
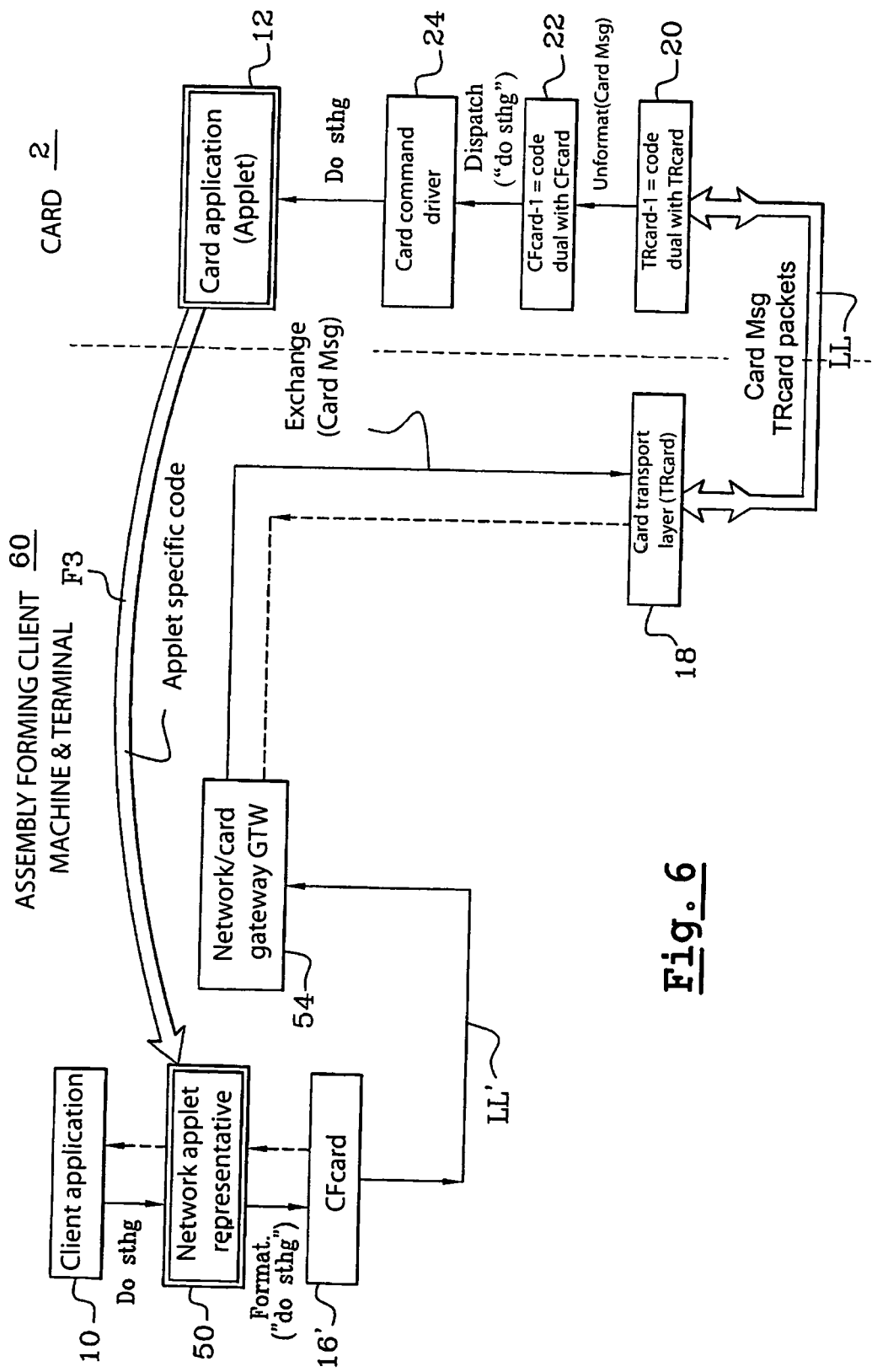
FIG. 6 is a diagram similar to that of FIG. 4, depicting another variant for the case of a direct connection between the client machine and the card, which constitutes a third embodiment of the invention.

In all the FIGS. 4 to 6, the elements already present within the context of FIGS. 1 to 3 bear the same references and will not be described again for the sake of conciseness.

FIG. 4 depicts the main elements which are involved in a first embodiment of the invention.

In accordance with this embodiment, a message transmission chain is established between a client application 10 situated on a client machine 30 and a card application (Applet) 12 situated in a smart card 2 or any other communicating portable device, associated with a terminal 31. Message transmission between the terminal 31 and the card 2 is provided by a local connection LL. The client machine 30 is remote and communicates with the terminal 31 via a network R, such as the Internet.

The transmission chain will be described within the context of a message, in this case the command "do Sthg", sent from the client application 10 to the card application 12.

At the client machine 30, a "Network Applet" representative 50 is provided for sending appropriate formatting commands from the messages of the client application 10. Thus, in the case of the message "do Sthg", the "Network Applet" representative 50 will produce a formatting command "format("do Sthg")".

In accordance with the invention, the message "do Sthg" is next coded, not in the format of the network R, but directly in a format understandable by the card application 12. To that end there is provided, downstream of the "Network Applet" representative 50, a card formatting code layer CFcard 16'. The function of this layer 16' is to create a message Card Msg, understandable by a dual layer CFcard$^{-1}$ 22 at the card 2, which corresponds to the high-level command "do Sthg". The dual layer 22 can then produce the command "do Sthg" in response to a command for unformatting the message Card Msg.

In order to provide the transport of the message Card Msg, the layer CFcard 16' initiates the process for encapsulating the message by requesting that said message is incorporated in a byte array "byte[]" format, which constitutes an envelope for the message, understandable by the network R, and inside which it can thus be transported as such through the network R. To that end, the layer CFcard 16' will be followed by a set of layers which will enable the transfer of the message on the network R.

In the example, this provision is obtained by an "exchange" operation which acts on the message Card Msg. Thus, the command "exchange(Card Msg)" is obtained at the output of the layer CFcard 16'.

This command "exchange(Card Msg)" is next transmitted from the layer CFcard 16' to a representative GTW 52 of the gateway 54. The function of this representative GTW 52 is to command the formatting of messages presented to it with a view to their transport on the network. The representative GTW is a software layer developed specifically to represent a network/card gateway GTW 54 situated at the terminal 31.

It may be noted that the gateway GTW representative 52 replaces the network server 34 of FIGS. 2 and 3. It is generic in the sense that it does not have the same interface as the card application (Applet) 12 contained in the card. This is because, unlike the aforementioned network server 34, it is not necessary for the gateway GTW representative 52 to interpret the content of the messages it conveys. For this, the layer CFnet 38 is used to "encapsulate", that is insert in an envelope, the message (Card Msg) to be conveyed by the network/card gateway GTW 54 according to a capsule (or envelope) format which is understandable by a generic gateway. In this context, the "exchange" operator, with the representative GTW 52, constitutes a new interface with regard to the network/card gateway 54 at the terminal 31, as will emerge later.

Thus, the gateway GTW representative 52 sends to a network formatting layer CFnet 38 a formatting command of the "format("exchange(Card Msg)")" type.

The layer CFnet 38 then sends the command in the form of a network message "Network Msg" to a transport layer TRnet 40. The latter provides the transmission on the network R of the command in the form of TRnet packets in the format of network messages. The functions of the layers CFnet 38 and TRnet 40 are in every respect analogous to those of the corresponding layers of FIG. 2.

It may be noted that the format of the message at the output of the layer TRnet 40 consists of two layers:
- an "inner" layer, where there is the card format, understandable by the card application 12, for example of the APDU, SMS or JavaCard RMI type; and
- an over-layer, which corresponds to the network formatting, for example according to the Internet protocol.

Conceptually, the message, in this case the command "do Sthg", is put in an envelope called "exchange", which is formatted with an address and conveyed by the transport layer TRnet 40.

On the other side of the network, at the terminal 31, the message issuing from the layer TRnet 40 is processed successively by dual layers TRnet$^{-1}$ 42 and CFnet$^{-1}$ 44, which produce the inverse functions respectively of the layers TRnet 40 and CFnet 38 of the client machine 30. As described within the context of FIG. 2, there are then obtained successively the command "unformat(Network Msg)" at the output of the layer TRnet$^{-1}$ 42 and the command "dispatch("exchange (Card Msg)")" at the output of the layer CFnet$^{-1}$ 44.

At the output of the layer CFnet$^{-1}$, the command "dispatch ("exchange(Card Msg)")" is taken delivery of by a network command driver 46, which directs it to the network/card gateway GTW 54 of the terminal. The gateway GTW 54 then dispatches the message "Card Msg" to a transport layer TRcard 18 of the terminal 31. Said layer provides the conversion to the transport format according to a specific packet division, for transmission on the local connection LL to the card 2.

At the card, the message thus transmitted is processed by the dual layers TRcard$^{-1}$ 20 and CFcard$^{-1}$ 22, which produce respectively the command "unformat(Card Msg)" and the command "dispatch("do Sthg")". The latter is taken delivery of by a card command driver 24 which transmits the command "do Sthg" to the card application (Applet) 12.

The organisation according to FIG. 4 is remarkable in that it requires the development of only a single code specific to the card application, namely the "Network Applet" representative 50 of this application at the client machine 30 (arrow F3). Unlike the case of FIG. 3, it is unnecessary to develop, code and manage a specific network server, or a representative of the card application on the server. There results therefrom a great simplification of the implementation of a network communication between the client application 10 and the card application 12.

Furthermore, the implementation of the network/card gateway GTW 54 is easy, since it is not specific to the card application 12. This is because it is sufficient for the network/card gateway GTW 54 to be specific simply to the established communication protocols, that is an input protocol and an output protocol, in order to provide the communication. In the example, the network/card gateway GTW 54 is capable of taking delivery of a message according to an Internet protocol in order to re-send it according to a card protocol.

FIG. 5 depicts the organisation of a second embodiment of the invention, adapted to communication between the client machine 30 and the terminal 31 according to a mode known by the name "socket". In accordance with the "socket" mode, an exchange format is pre-established between the client and the server, which makes it possible to dispense with the network gateway GTW representative 52 and the layer CFnet 38 at the client machine 31, and the dual layer CFnet$^{-1}$ 44 and the network command driver 46 at the terminal 31. Except for the removal of these elements, the configuration and principle of operation of this embodiment are identical to those of FIG. 4.

FIG. 6 depicts the organisation of a third embodiment of the invention, adapted for the case of a client application 10 situated on the same physical medium as the terminal comprising the gateway GTW 54.

According to this configuration, the physical medium 60 incorporates a direct internal connection LL' between the layer CFcard 16' and the gateway GTW 54. It may be noted that the latter is a gateway of the internal connection/card type. The "exchange" type commands at the output of the layer CFcard 16' thus dispatched directly to the network/card gateway GTW 54 are retransmitted by the latter to the card application 12 through the successive layers 18 to 24, as in the preceding cases.

In a variant, the assembly 60 can be connected via the same network/card gateway GTW 54 to both the client application 10 which it incorporates and any other client application connected by network, which imparts versatility at system architecture level.

Of course, the communication systems of FIGS. 4 to 6 also make it possible to manage the message returns (dotted arrow path) from the card application 12 to the client application 10 by simple inversion of the conversions at the successive layers.

In all the embodiments, it is easy to implement "end-to-end" security between the client application 10 and the card application 12. This is because, since the network/card gateway GTW 54 does not need to interpret the content of the messages, it becomes possible to make the messages secure at the layer CFcard 16 of the client machine and keep them secure as far as the dual layer CFcard$^{-1}$ 22 of the card 2, where they can be decoded.

The invention has been described within the context of applications on a smart card 2 which are accessed by a client application on a remote terminal (FIGS. 4 and 5) or a local terminal (FIG. 6). It is however clear that the principles of the invention have a much broader scope, covering the entire field of establishing compatibility of communicating systems. By way of non-limiting examples, the invention can also be implemented with:
- any communicating device, portable or not;
- any type of communication protocol on a network or on a local connection;
- any type of application at each end of the communication chain;
- any message structuring and formatting protocol according to the software layers and languages used;
- an unlimited number of connected communicating machines.

The invention claimed is:

1. A method of establishing a communication channel via a connection between a client application executing on a client machine and a service application executing on a communicating device that is dependent on a terminal, the client machine including a representative of the service application, comprising the following steps:
   - formatting messages from the client application at the client machine, downstream of said representative, in a form that can be read by the service application; and receiving said formatted messages at a gateway and transmitting them to the service application.

2. The method according to claim 1, wherein the communicating device is a smart card, and the service application is a card application.

3. The method according to claim 1, further including the step of encrypting the messages during or before the formatting step to enable encrypted messages issuing from the formatting module to pass in encrypted form through the gateway and to the communicating device.

4. The method according to claim 1, wherein the client machine is connected to the terminal by a network, and the formatting step is followed, at the client machine, successively by the steps of:

receiving formatting commands from the formatting step at a representative of said gateway and producing formatting commands from said received commands according to a format that can be read by said gateway;

formatting the messages issuing from said representative of the gateway into messages having a network format; and adapting said messages to standards for communicating via the network;

and wherein the messages received from the network at the terminal are processed successively by steps of:

retrieving said messages from the messages issuing from the network;

retrieving the commands from the representative of said gateway; and transmitting messages containing said retrieved commands to said gateway.

5. The method according to claim 1, wherein:

the formatting step is followed directly by a step of adapting said messages to standards for communicating over the network and further including the step of processing the adapted messages at the terminal to retrieve said messages issuing from the formatting step and retransmit said messages directly to said gateway.

6. A system establishing a communication channel via a connection between a client application executing on a client machine and a service application executing on a communicating device dependent on a terminal, comprising:

a representative of the service application installed in the client machine;

a formatting module situated at the client machine, downstream of said representative, for formatting messages of the client application in a form that can be read by the service application; and a gateway situated at the terminal for taking delivery of said messages that can be read by the communicating device and transmitting said messages to the service application.

7. The system according to claim 6, wherein the communicating device is a smart card, and the service application is a card application installed in the smart card.

8. The system according to claim 6, further including means for making the messages secure at least by the time they issue from the formatting module to enable said messages to pass in secure form through the gateway and to the communicating device.

9. The system according to claim 6, wherein said connection comprises a network connecting the client machine and the terminal, and said gateway is capable of communicating over said network.

10. The system according to claim 9, wherein the formatting module is connected to the network via a sequence of modules successively comprising:

a representative of said gateway, for receiving formatting commands from the formatting module and producing formatting commands from said received commands according to a format that can be read by said gateway;

a network formatting module for formatting said commands from the gateway representative into messages having a network format; and a transport module for adapting said messages to standards for communicating via the network;

and wherein said gateway is connected to the network via a sequence of modules successively comprising:

a first module which performs an inverse function of the transport module, and which is connected to the network for retrieving said messages communicated over the network;

a second module which performs an inverse function of the network formatting module for retrieving the commands from the representative of said gateway; and a network command driver for transmitting the messages coming from said second module to said gateway.

11. The system according to claim 9, wherein:

the formatting module is connected to the network via a transport module to directly receive said messages from the formatting module and format them to standards for communicating over the network, and said gateway is connected to the network via a module which performs an inverse function of the transport module for directly retrieving said messages from the network and retransmitting said messages directly to said gateway.

12. The system according to claim 6, wherein said client machine and said terminal are combined in a single physical medium and connected by an internal connection, and wherein the formatting module directly transmits via said internal connection the formatted client application messages.

* * * * *